(12) United States Patent
Florin et al.

(10) Patent No.: US 6,754,400 B2
(45) Date of Patent: Jun. 22, 2004

(54) SYSTEM AND METHOD FOR CREATION, PROCESSING AND VISUALIZATION OF OMNI-DIRECTIONAL IMAGES

(75) Inventors: Rusu Mihai Florin, Bucharest (RO); Sever Serban, Bucharest (RO)

(73) Assignee: Richard Wilson, Jr., Queens Village, NY (US)

( * ) Notice: Subject to any disclaimer, the term of this patent is extended or adjusted under 35 U.S.C. 154(b) by 583 days.

(21) Appl. No.: 09/777,912

(22) Filed: Feb. 6, 2001

(65) Prior Publication Data

US 2002/0141659 A1 Oct. 3, 2002

(51) Int. Cl.$^7$ .................................................. G06K 9/36
(52) U.S. Cl. .................. 382/285; 382/167; 382/154; 382/284; 382/274; 382/275; 382/295; 382/296; 382/299; 345/419; 345/424
(58) Field of Search ............................. 382/103, 171, 382/190, 282, 284, 285, 294, 295, 154; 358/538, 450, 453; 345/419, 424, 664, 679

(56) References Cited

U.S. PATENT DOCUMENTS

| | | | |
|---|---|---|---|
| 4,515,450 A | * 5/1985 | Arrazola | 353/5 |
| 5,185,667 A | 2/1993 | Zimmermann | |
| 5,582,518 A | * 12/1996 | Henique et al. | 434/44 |
| 5,687,249 A | * 11/1997 | Kato | 382/104 |
| 5,877,801 A | 3/1999 | Martin et al. | |
| 6,320,584 B1 | * 11/2001 | Golin et al. | 345/629 |
| 6,385,349 B1 | * 5/2002 | Teo | 382/284 |
| 6,434,265 B1 | * 8/2002 | Xiong et al. | 382/154 |

OTHER PUBLICATIONS

Ken Turkowski, "Making Environment Maps from Fisheye Photographs", http://www.worldserver.com/turk/quicktimevr/fisheye.html; Jul. 4, 1999.

Ned Greene, "Environment Mapping and Other Applications of World Projections", Nov. 1986 IEEE.

* cited by examiner

Primary Examiner—Timothy M. Johnson
Assistant Examiner—Yosef Kassa

(57) ABSTRACT

A system and method for digitally rendering omni-directional images includes capturing images of a region 360 degrees about an origin point in a single plane, and assembling the images in a digital format to create a complete spherical image surrounding the origin point. The spherical image is projected onto faces of a cube surrounding the spherical image. Images which were projected on the faces of the cube may then be rendered to provide an omni-directional image.

40 Claims, 9 Drawing Sheets

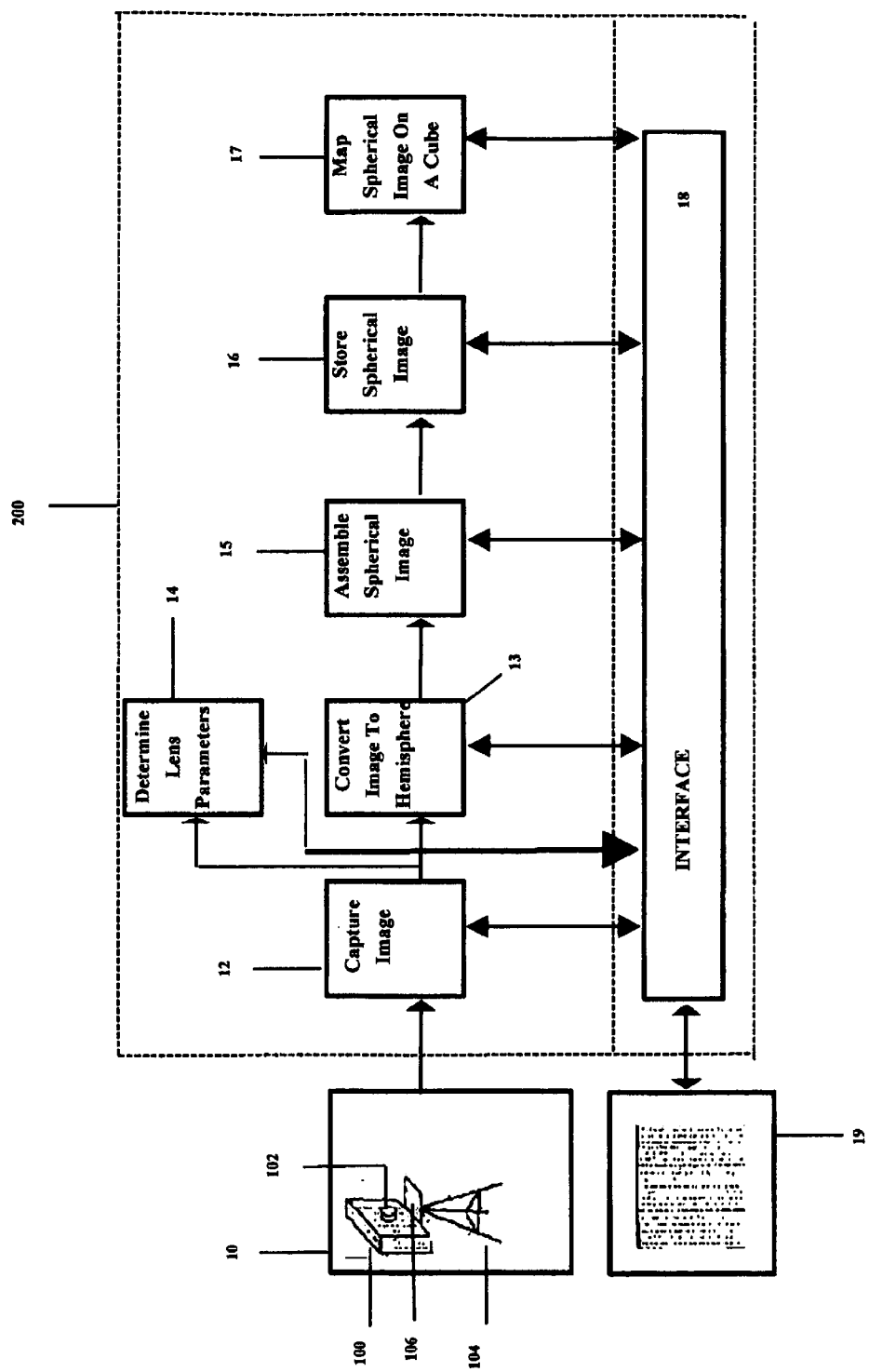
FIGURE ONE

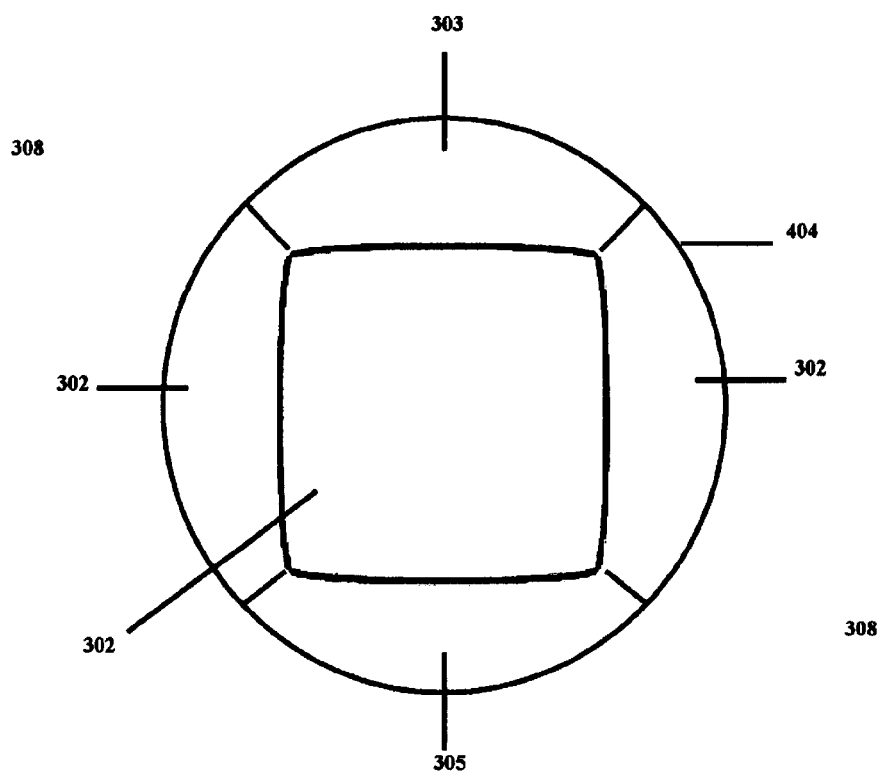
FIGURE TWO

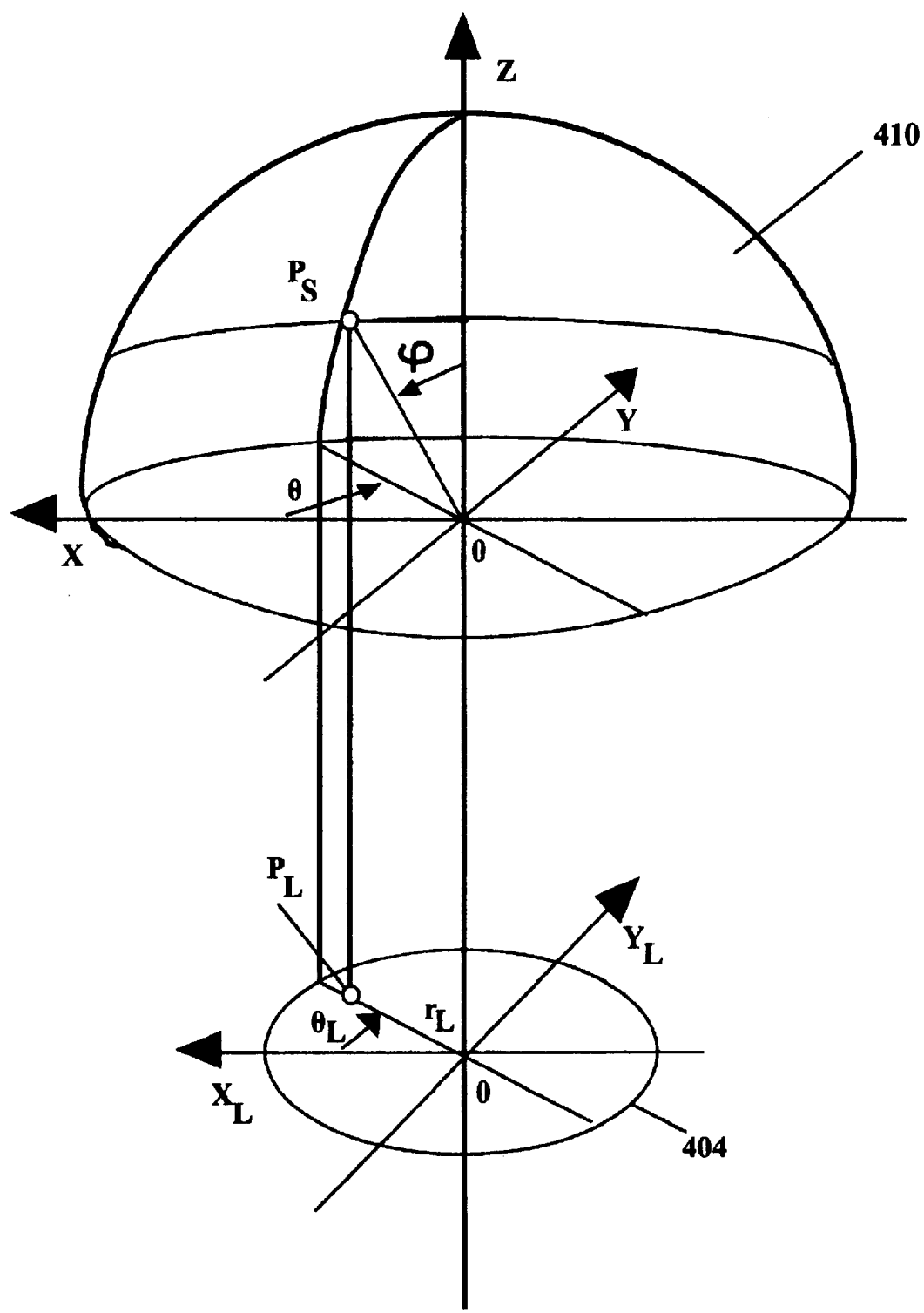
FIGURE THREE

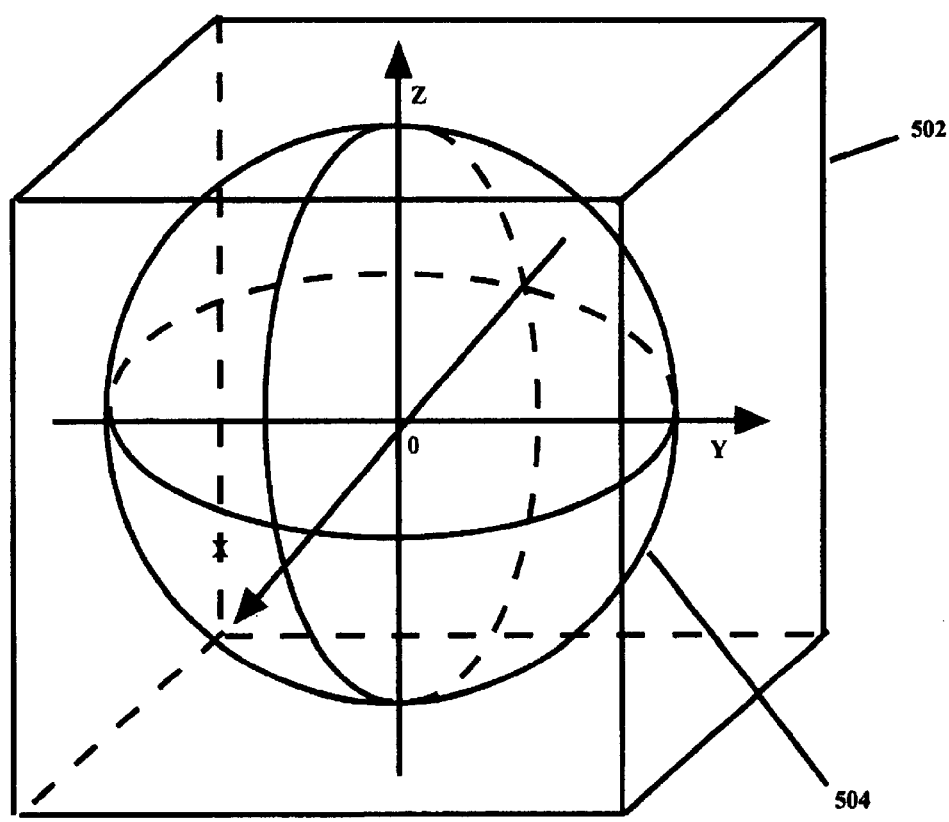
FIGURE FOUR

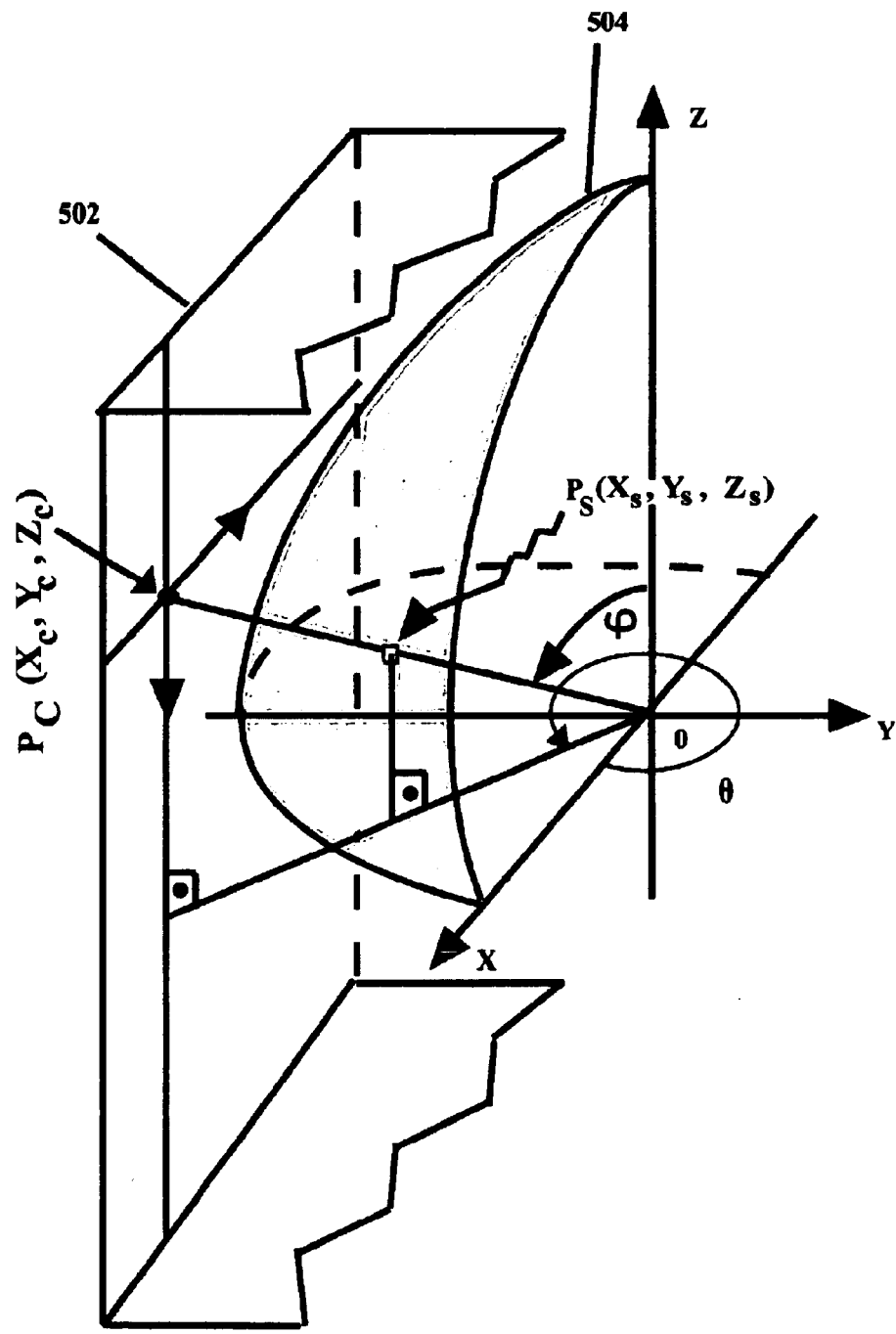
FIGURE FIVE

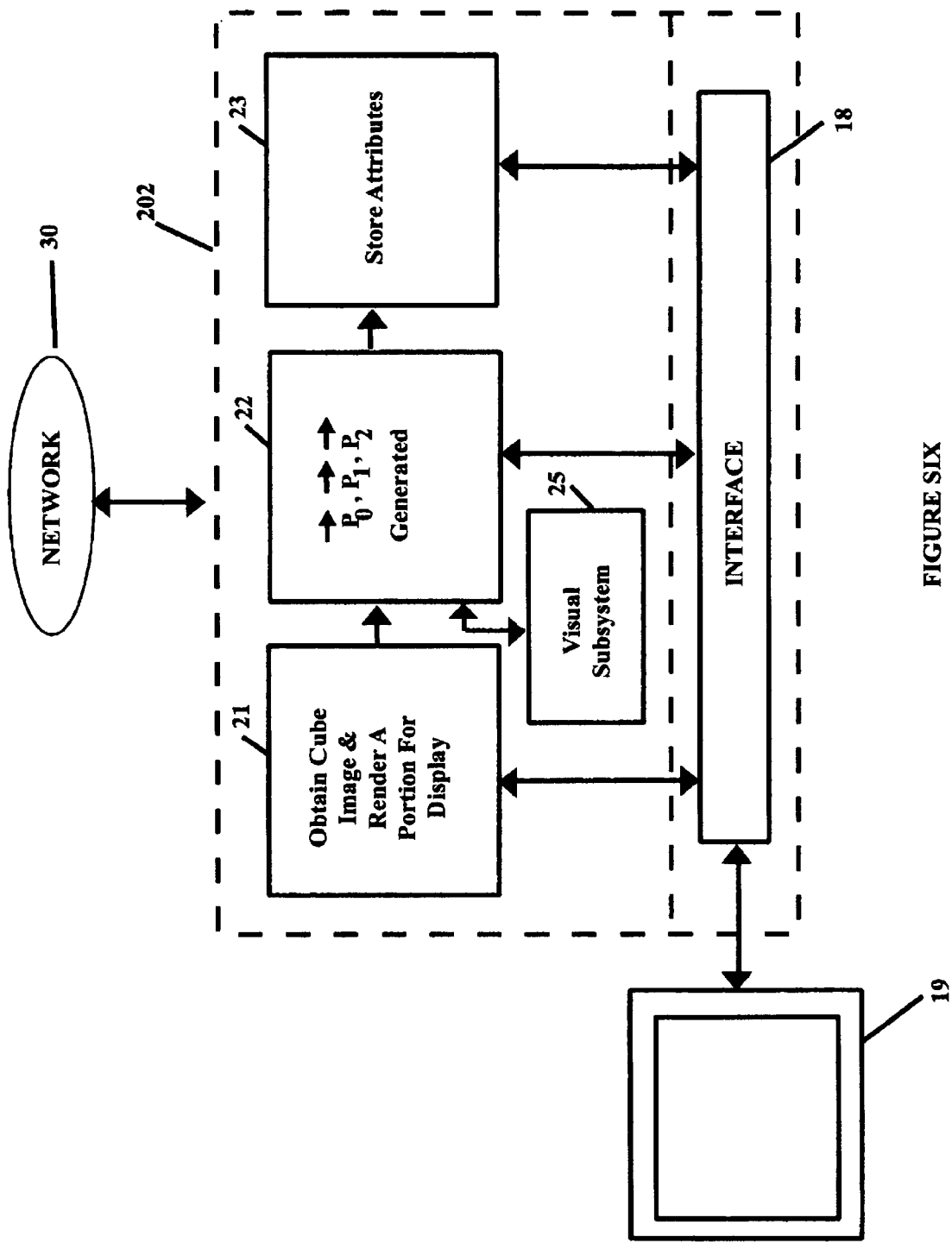
FIGURE SIX

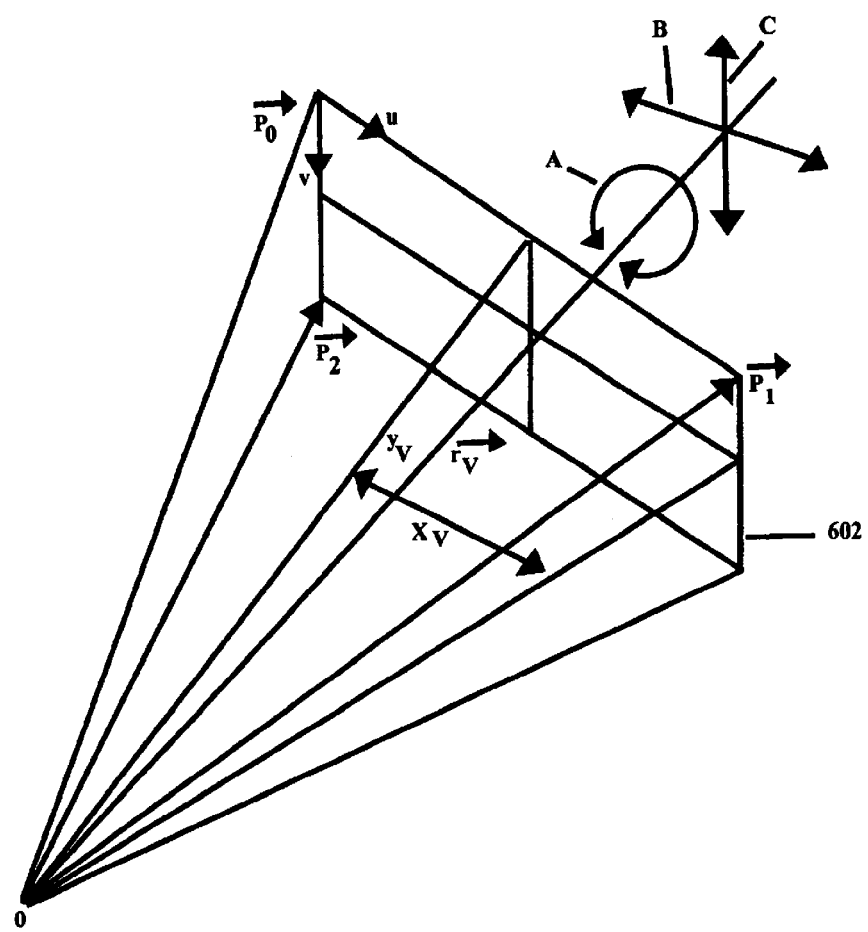
FIGURE SEVEN

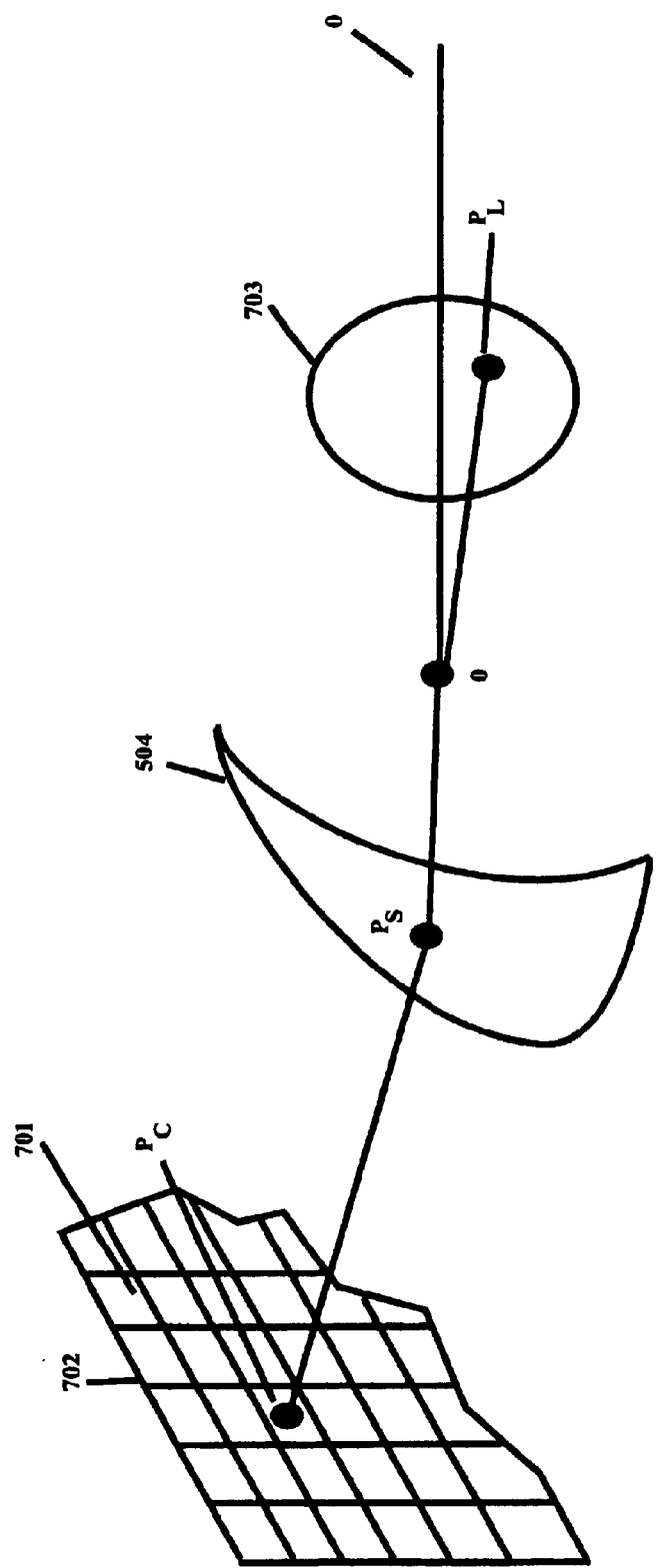
FIGURE EIGHT

```
Account For            Filter Images To    Cover Image          Maintain The          Estimate Rays
Radial         →       Black & White   →   With More Light   →  Center Of The    →    For The Poles      →   Account For
Distortions            805                 & Approximate       Image As The          Of The Image            Color, Brightness,
801                                        The Center Of       Point Where           811                     Etc. Distortions
                                           The Image           The Most Rays                                 814
                                           807                 Are Equal
                                                               809

Account For Geometric Distortions By
         Determining The Center Of The Image - 802
```

FIGURE NINE

SYSTEM AND METHOD FOR CREATION, PROCESSING AND VISUALIZATION OF OMNI-DIRECTIONAL IMAGES

BACKGROUND

1. Technical Field

This disclosure relates to image creation processing and visualization and more particularly, to a system and method for providing digital images with a three dimensional perspective while eliminating distortions and reducing computation time.

2. Description of the Related Art

Imaging systems which record real-world images and convert then to digital format are known in the art. These imaging systems employ a camera, such as a digital camera, to digitally render an image in a format compatible for use with computers. These digitally rendered images may then be stored, transferred (e.g., over the Internet) or otherwise manipulated by known techniques.

Systems known in art also provide for perspective imaging of three dimensional images in two dimensions, (e.g., rendered on a computer display). These systems, however, are often limited and may suffer from at least some of the following disadvantages:

1. The systems are dedicated exclusively to orientating robots in a limited space;
2. The visualization by a user consists only of views with rotation and rectilinear movement in a horizontal plane;
3. Spherical images presented by the systems include distortions on the demarcation line between two of more images which are combined.

Therefore, a need exists for a system and method, which solves the problems and difficulties of the prior art and increases the capabilities of three dimensional visualization of digitally rendered images.

SUMMARY OF THE INVENTION

The creation, processing and visualization of omni-directional images system of the present invention, gathers two plane complementary images, preferably captured with a digital camera endowed with a fish-eye lens having a 180 degree FOV open angle. The system reforms the hemispherical images associated with the planar images taken by the fisheye lens, using specific laws of projection, corrects the radial and geometrical distortions as well as the color and light distortions and assembles the images into a complete spherical image, which is projected on a cube. Viewing of these images creates an impression of turning around in all the directions and of rectilinear movement in virtual space. The impression created is very similar to the human eye perception of the tri-dimensional space, and it permits continuously or a successive visualization of some three-dimensional images including specific details that a user may want to examine closer.

These and other objects, features and advantages of the present invention will become apparent from the following detailed description of illustrative embodiments thereof, which is to be read in connection with the accompanying drawings.

BRIEF DESCRIPTION OF DRAWINGS

This disclosure will present in detail the following description of preferred embodiments with reference to the following figures wherein:

FIG. 1 is a block/flow diagram for a system/method for creating omni-directional images in accordance with the present invention;

FIG. 2 is a structure of a planar fish-eye image with distortions taken with a wide opened angle of 180-degree field of view (FOV), two of these fish-eye images taken with 180 degree FOV in a plane include all the information for a spherical representation in accordance with the invention;

FIG. 3 shows a projection characteristic for the fish-eye lens image of FIG. 2 for providing an ideal equi-distance projection model in accordance with the invention;

FIG. 4 shows a reference system for a complete spherical image and a cube that the spherical image will be projected on in accordance with the present invention;

FIG. 5 shows a projection of the spherical image of FIG. 4 on the cube's surfaces along with attributes associated with on the spherical image in accordance with the present invention;

FIG. 6 is a block/flow diagram of a system/method for dynamically visualizing and exploring omni-directional images in accordance with the present invention;

FIG. 7 is a perspective view showing the generation of window showing a portion of the cube image needed for dynamic visualization and exploration of the cube image in accordance with the present invention;

FIG. 8 is an illustrative a perspective view showing the mapping of points onto a cube face in accordance with the present invention; and FIG. 9 is block/flow diagram showing the removal of distortions in fisheye images in accordance with the present invention.

DETAILED DESCRIPTION OF PREFERRED EMBODIMENTS

The present invention provides a full unitary system capable of creating a complete spherical image using plane images to correct radial, geometrical, color and light distortions associated with formation of the spherical image. The omni-directional spherical image provided by the present invention provides the user with additional degrees of freedom, permitting the viewer to visualize rotation in a horizontal, vertical or any other axes plane, and to realize a rectilinear movement. The present invention permits visualization from all possible directions of a spherical image as well as eliminates distortions of hemispherical images. In addition, the system of the present invention permits the successive visualization of a logical chain of images. For example, in one application of the present invention a user may seamlessly walk between rooms in a virtual environment.

In one embodiment of the present invention two plane images of an environment are taken a 180 degrees field of view (FOV) to provide a full 360 degree image of the environment. The two plane images are preferably taken in a horizontal plane, both of them being created by a wide angle lens, such as a "fish-eye" lens (the fish-eye lens has a 180 degree FOV wide open angle) and a camera, such as a digital camera, although any camera may be employed and the images digitally rendered at a later time. The system is also able to remake the hemispherical images associated with the plane images by specific projection and correction laws to assemble the images in a complete spherical image and permitting the visualization of different parts of the complete image, creating the sensation to a viewer that the image permits viewing by rotation and rectilinear movement in all directions. Advantageously, the sensation is similar to human eye perception.

The present invention provides at least the following advantages. The present invention in its software form is compact, unitary and easy to transfer onto and between computers. The present invention creates a complete spherical image based on two plane images, and aides in the calibration of a digital camera working with a fish-eye lens in determining the radial correction parameters. The present invention is capable of filtering out geometrical distortions, light distortions and/or color distortions between images. The present invention is able to take images created at a given location and transmit the realized images over a distance via a network, such as the Internet, a local area network or any other network system. A complete visualization from all directions of different parts of the spherical image is provided, reproducing all the freedom degrees in a three-dimensional space. The present invention also provides optimization between calculation time and the image quality. The present invention permits the successive visualization of some omni-directional images having a frequency that is compatible to the human eye retina remanence (e.g., at least 3 images/second, and preferably greater than or equal to about 30 image/second) so that the result will be a continuous visualization.

It should be understood that the elements shown in the FIGS. may be implemented in various forms of hardware, software or combinations thereof. Preferably, these elements are implemented in software on one or more appropriately programmed general purpose digital computers having a processor and memory and input/output interfaces. Referring now to the drawings in which like numerals represent the same or similar elements and initially to FIG. 1, a block/flow represents a system/method for creation, processing and visualization of omni-directional images in accordance with the present invention. In block 10, a camera 100, preferably a digital camera, is provided with a wide angle lens 102 for capturing a hemispherical image or portion thereof of a surrounding environment. In one particularly useful embodiment, the environment includes a room in a building or house, although other environments are also contemplated. Wide angle lens 102 may include a fish-eye lens, preferably a 180 degree field of view opened angle lens. Lens 102 may include a focal distance of, for example, 8 mm. Camera 100 is fixed on a tripod 104 or other support structure which permits a rotation of the camera in a horizontal plane (other rotational planes may also be employed). A scaled measurement device 106 or VERNIER may be employed to measure rotational angles and/or to restrict rotational motion. It is preferable that mount 104 is able to rotate camera 100 about the focal point of lens 102. Camera 100 is rotated in the selected plane of rotation. In a preferred embodiment, the capture of the two images is performed by capturing a first image and then rotating the camera in the selected (e.g., horizontal) plane by 180 degrees and capturing a second image. More images may be taken as well, however, two images will be illustratively described throughout this disclose, for simplicity.

In block 12, image information captured by camera 100 is stored numerically in two memory matrices of system 200, e.g., one matrix for each 180 degree image. System 200 preferably includes a computer system with memory and input/output interfaces. Camera 100 may be remotely located relative to system 200, and images may be transmitted to system 200 over a network, such as the Internet, satellite, wireless link, etc. The maximum dimension of the matrices corresponds to the best sensitivity/resolution desired or attainable by the fisheye images. In one example, the resolution is about 1400×700 dpi. In memory matrices, colors of pixels or points are stored as defined by the polar coordinates of the pixels of the image. The polar coordinates include the radius r and the angle $\theta$ (see e.g., FIG. 3). Every memory location stores, the color of the specified point expressed as a combination of the red, blue and green (RGB) colors. The representative of the information is preferably hexadecimal and each color has, for example, 256 color levels (0-absent, 255-total), each color level will have two memory cells reserved so that every memory word will be six memory cells long (two memory location for each color (RGB)). If brightness $\alpha$ of the point is considered, then more memory cells are needed (e.g., two additional memory cells and thus eight memory cells are employed). The image points are mapped to the matrices however distortions in the captured images need to be accounted for.

In FIG. 2, a plane fish-eye image is illustratively shown to indicate distortion in a three-dimensional space. Walls 302, ceiling 303 and floor 305 of a room include curved surfaces due to the wide angle (fish-eye lens) distortion. FIG. 2 is a planar projection 404 of a hemisphere captured by a camera with a fish-eye lens. Light in a hemisphere is captured by fish-eye lens 102 to permit mapping of the image to a planar projection 404. Points on the planar projection may be defined in polar coordinates $r_L$ and the angle $\theta_L$ (See FIG. 3). The subscript L denotes dimensions in a circle of the same latitude.

Two planar projection images are obtained as described with reference to FIG. 1. The two images are offset by a 180-degree angle in a same rotation plane. These two images provide all the information of a three-dimensional space surrounding a camera but with geometrical distortions due to the lens. Even if the fisheye lens has a 180 degree wide open angle, its real angle is about 183 degrees and supplementary information will be represented as a halo that will be cut off from the image at the beginning of the process.

There are three types of distortions specific to the fisheye images:

1. Radial distortions
2. Geometrical distortions
3. Brightness and color distortions.

Radial distortion are addressed below with reference to FIG. 1 block 13 and 14. The geometric distortions are reduced or eliminated in accordance with the present invention in block 10 of FIG. 1. FIG. 9 shows a block diagram for method steps for eliminating these distortions in accordance with the present invention.

In block 801, the radial distortions are removed preferably using the real equidistant pattern, as described herein below.

The geometrical distortions are caused by the difficulty of positioning the camera and the fisheye lens in a perfectly horizontal plane. In real situations, the fisheye image may be rotated slightly in relation to the horizontal plane. The geometrical distortions are also caused the difficulty of rotating the camera with exactly 180° when to get two fisheye images to make a complete image. A supplementary rotation in relation to the center axis of rotation may be needed. The geometrical distortions are caused by the distances in every fisheye image of areas placed at the circumference of the image which is also encountered in the repetitive image (overlap) which, should be removed when the entire omni-directional image is formed.

The effect of these inherent errors in positioning the camera for each picture, include the following. The errors in the positioning on the horizontal plane (the camera may be tilted forward (backward) or sideways) cause the center of the (circular) fisheye image to be shifted away from the center of the window of the image to be taken. Consequently, the respective correction is needed by establishing of the center of the image (the inventors have noticed that errors of few pixels at the image level cause important deviations in assembling the fisheye images). The errors in the side-to-side tilt of the camera causes the two fisheye images not to assemble correctly and this would be very visible on the border lines of the two images. In addition, the failure to remove the repetitive areas in the two fisheye images leads to the presence of some repeated regions in the omni-directional image, as well as to the unpleasant presence of a (blue) shade.

Correcting the errors for these geometrical distortions may include the following measures:

1. fixing the center of the fisheye image;
2. automatically establishing the radial cutting degree of every fisheye image, as well as the rotation of one image to another for as precise a fitting as possible.

Geometrical distortions are accounted for in block 802, by determining the center of the fisheye image. Each fisheye image is enclosed in a black window (e.g., region 308 in FIG. 2). The center of the fisheye image may be different from the center of the window (the desired image to be taken). Since the entire mathematical equidistant pattern (for radial distortions) functions only with respect to the center of the image, the center needs to be determined accurately or fixed with a precision of, for example, one to two pixels. This action is made more difficult in that acquiring any fisheye image the side-light causes changes in the outline of the image in different areas of the image. Also, the lower part of the image (e.g., the part of the image closest to the camera mount or tripod) includes a dark color (close to black). These inconveniences are overcome with the help of the following actions in accordance with the present invention. These actions may include the following.

In block 805, filtering the fisheye image until, e.g., only two colors exist in the window, preferably, black and white. This underlines or highlights the outline of the fisheye image and removes the side-light effects. In block 807, the fisheye image may be covered with a larger number of rays (more light). The rays are considered from a center point inside which may represent the center of the image. In block 809, the center of the fisheye image is maintained as the point for which a number of equal rays is the largest (preferably with a precision of one or two pixels). In block 811, to increase the precision in determining the center of the fisheye image, the rays from the area of the two poles are avoided (north—superior or top of the image and south—inferior or bottom of the image), which, statistically, are the most disturbed. By performing the center of the image determination and the other steps. An image with reduced geometric distortion is provided.

In block 814, brightness and color distortions are resolved. This may include pixel averaging or other methods as described herein.

Referring to FIGS. 1 and 3, in block 13, each of the two images are converted into a hemispherical image 410, removing the geometrical distortions created by the lens, as described above with reference to FIG. 9. For radial distortions, the projection laws specific to the ideal model of equi-distance for the fisheye lens may include:

$$x_L = c\phi_S \cos\theta_S$$
$$y_L = c\phi_S \sin\theta_S \quad (1)$$

where $\theta_s$ and $\phi_s$ are the spherical coordinates in the three-dimensional space, c is a scale factor depending on the focal distance of the objective and on the proper scaling of the image representation. Notice that:

$$\theta_L = \theta$$
$$\sqrt{x_L^2 + y_L^2} = c\phi_S = r_L \quad (2)$$

where $r_L$ is the polar distance in a planar fish-eye image and $\theta_L$ is the angle of the fish-eye image. In other words, a circle on the fisheye image transforms to a circle of same latitude on the image hemisphere being projected.

In block 14, radial distortion is specific to this kind of lens. The characteristic difference from the linear dependence of equation (2) for the real model of the fisheye lens shows that:

$$r_L = c_1 \phi_S + c_2 \phi_S^3 + c_3 \phi_S^5 + \ldots \quad (3)$$

where $c_1$, $c_2$, $C_3$ are constants which directly depend on the physical realization or construction of the fish-eye lens. (other distortion equations are also contemplated). These parameters ($c_1$, $c_2$, $c_3$) account for the distortion of the lens. The lens can therefore be calibrated to determine these parameters or the distortion coefficients provided by the lens manufacturer. A model which includes up to the third term in the series of equation (3) is considered precise enough for the whole scale of fish-eye lens for purposes of this disclosure.

Parameters or coefficients (e.g., $c_1$, $c_2$, $c_3$) may be determined for the hemispherical model, using a procedure which provides global minimization of a performance index to reduce or eliminate radial distortion effects. Calibration of the lens may be performed one time, and therefore block 14 is optional if the lens distortion is known or has been previously calibrated. In one embodiment, at least three images, preferably four images (denoted by $I_i$) are taken with the fisheye lens at equal angles in a horizontal plane (e.g., 4 images at 90 degrees), so that there will be several overlapping zones (redundancy zones with about a 90 degree overlap) situated between the neighboring images (denoted by $A_{ij}$). The overlap provides redundant information so that the distortion parameters can be determined. The performance indices will be selected by practical type and based on the errors coming from the redundancy form, that means:

$$J_{ij} = \frac{1}{A_{ij}} \sum_{x_k \in A_{ij}} \varepsilon_k^2 \Rightarrow J = \sum_{\forall (i,j): A_{ij} \neq 0} J_{ij} \quad (4)$$

$$\varepsilon_k = [I_i(x_k) + \alpha_i] - \{I_j[T(x_k; p)] + \alpha_j\}$$

where $J_{ij}$ determines a square medium error between the images i and j at the overlapping level, p is the vector of the parameters ($c_1$, $c_2$, and $c_3$, the coefficients belonging to the real model of the fisheye objective (see equation (3)) and J is the entire index of performance to be minimized to obtain an image closest to the ideal model for the fish-eye lens. The relation of equation (4) includes a function T which denotes a transformation of connection between the i and j images. This may be determined by:

$$T(x_k) = T_3(T_2(T_1(x_k))) \quad (5)$$

where $T_1(X_k)$ corresponds to the transformation of each point $x_k$ of the plane image j at the corresponding point of the associated hemispherical image; in this direction, the models of equations (1), (2), and (3) will be exploited in an inverse order. Inverse functions $\Phi$ and arc tangent are employed as shown in equation (6).

$$\phi_S = \Phi(r; c_1, c_2, c_3) \qquad (6)$$

$$\tan\theta_S = \frac{y_S}{x_S} \Rightarrow \theta_S = \arctan\left(\frac{y_S}{x_S}\right)$$

A Newton-Raphson procedure or other numerical procedure may be needed to solve equation (6). The coordinates of the associated point on the sphere are $$x_S = R \sin\phi_S \cos\theta_S$$
$$y_S = R \sin\phi_S \sin\theta_S$$
$$z_S = R \cos\phi_S \qquad (7)$$

$T_2$ in equation (5) corresponds to rotation matrices (in a horizontal plane) between the image i and the image j;

$T_3$ in equation (5) corresponds to the hemispherical image j in the planar fish-eye projection image, according to the models of equations (1) and (3).

To establish the indices of performance error the color and light attributes of those points that are common for i and j images are used to determine overlap between the images.

In block 15, a complete spherical image is created by assembling two hemispheres and eliminating the redundant information on the limits of the fish-eye images. Care should be taken to realize correctly, the coincidence of the equal latitude lines of the hemispherical images. The convention described below may be used:

$$\varphi_S \in \left[0, \frac{\pi}{2}\right] \Rightarrow \text{points of the first image}$$

$$\varphi_S \in \left(\frac{\pi}{2}, \pi\right] \Rightarrow \text{points of the second image} \qquad (8)$$

The corrections that are performed, in block 15, include the removal the peripherical pieces of the plane fisheye images that are strongly distorted (the halo). This may be realized by cutting out of the images the external pieces having a coefficient of about, e.g., 98% from the image radius. The light between the two hemispherical images is corrected to ensure consistency in viewing. This may be performed by taking a mean value between parameters of the images (e.g., brightness, color, etc.) (see block 814 in FIG. 9). Corrections on the demarcation line between the two hemispherical images is performed. For this purpose, the color, brightness, contrast, etc. attributes of the pixels belonging to the limits (frontiers) of the neighboring images are mediated (average or mean value is employed). One hemispherical image may be employed as a reference image while the other hemispherical image is adjusted to reduce or eliminate the demarcation line. In a preferred embodiment, the mean value may be linearly interpolated over a band or group of pixels so that the color, brightness, etc. attributes of the pixels in a whole band are merged to hide or erase the demarcation line.

Alignment of the two hemispherical images may be performed by an alignment method. The alignment method includes the automatic determination of the radial cutting degree (the amount of the image to be cut off) of each fisheye image, as well as of the rotation of the image. In the framework of a computer program, a sub-program was created by the inventors which permits the successive cutting of a single row of pixels at a time from the image, followed by a rotation with respect to the z axis to move the images closer.

Lines, brightness, color or other criteria in the image give clues as to the orientation of the image. By determining the errors between pixels between the two images, (error functions are known in the art), an iterative process is performed to shift the rotation (after cutting a previous row of pixels) until a minimum is achieved for a threshold criteria based on the error between the pixels of the corresponding images situated on the circumference of the two fisheye images. The minimum achieved indicated the demarcation line at which the images are to be combined in an omni-directional image. In block 16, a complete spherical image is stored.

In block 17, a mapping of the spherical image on a cube's faces is performed. To simplify the relation, the present disclosure will consider a cube 502 directed to a spherical image 504 as illustratively presented in FIG. 4. A corresponding projection of image 504 is illustratively represented according to FIG. 5. In FIG. 5, each point $P_S$ on the sphere image 504 is associated with and projected to a point $P_c$ on cube 502 that will gather all the attributes of color, contrast and light of the point on the sphere 504 (the corresponding point in the initial fish-eye images). The correspondence is denoted by:

$$(x_S, y_S, z_S) \rightarrow (x_C, y_C, z_C) \qquad (9)$$

The image projection to a cube provides many advantages over the prior art as will described in greater detail below.

Returning to FIG. 1, block 18 includes a user interface, which may include a keypad, mouse, touch screen device, a speech recognition system or any other input device. In one embodiment, the user interface is employed with blocks 12–17 to control the mapping process. For example, a user may choose a pair of fisheye images that will be processed, fix the resolution for the cubical mapping images, filter the images (e.g., attaching the neighboring points of the images by the mean of color attributes, correct the light between the two hemispherical images, make corrections on the demarcation line between the two hemispherical images (e.g., blur), or perform other user controlled functions. Automation of any or all of these processes is also contemplated. Block 19 includes a display device which is employed in the creation, processing and visualization of images and is employed by a user to perform interfacing tasks, etc. in accordance with the description with reference to FIG. 1.

To obtain images of a given resolution and of a uniform density on the faces of the cube, in block 17, the exploitation of the previously described algorithm will be made on the inverse correspondence. That means exploitation of each face of the cube 504 with a given resolution (the resolution can be modified as desired by a user) on the two directions of the associated plane for that face of the cube is performed, where the current point is $P_C$ ($x_C$, $x_C$, $z_C$) having known coordinates. $P_C$ ($x_C$, $x_C$, $z_C$) will receive the color attributes of the correspondent point of the plane fish-eye image, previously taken. The point on the sphere corresponding to $P_C$ is $P_S$ ($x_S$, $y_S$, $z_S$) and $P_S$ has polar coordinates:

$$R_S\sqrt{x_C^2 + y_C^2 + z_C^2}$$

$$\varphi_S = \arctan\frac{z_C}{\sqrt{x_C^2 + y_C^2}} \Rightarrow P_S(x_S, y_S, z_S);$$

$$\theta_S = \arctan g(x_C + jy_C); \ j = \sqrt{-1} \qquad (10)$$

and these coordinates may be passed into Cartesian Coordinates with equation (5). The points of the fish-eye images that will be attached to $P_S$ are $P_L$ ($r_L$, $\theta_L$), having the polar coordinates:

$$r_L = c_1\phi_s + c_2\phi_s^3 + c_3\phi_s^5$$

$$\theta_L = \theta_s \quad (11)$$

Once $P_L$'s attributes are identified, $P_L$'s attributes are attached to $P_C$. Using this procedure, the whole mapping on the cube operation is performed quickly and efficiently. Advantageously, the resolution of the mapping on the cube can be easily selected and changed. A uniform fisheye image projected to a cube may include areas of non-uniformity.

Referring to FIG. 8, in accordance with the present invention, the resolution on cube faces 702 is determined or selected by a user. Each face of the cube is divided with a step size chosen for each direction (e.g., x and y). The step size or spacings (shown illustratively as a grid 701 in FIG. 8) will determine the resolution of that face of the cube. As shown in FIG. 8, a point $P_C$ on the cube may be selected based on the desired spacings (resolution) of grid lines of the cube face 702. A point $P_S$ on the sphere 504 is determined in correspondence with $P_C$. Using a reference point O (e.g., origin), $P_S$ is identified for a point $P_L$ from the fisheye lens image 703. Once $P_L$ is identified attributes of the point are known, e.g., color, contrast, luminosity, brightness, etc. The fisheye image point is then attached to $P_C$.

In some situations, $P_L$ may not coincide with an image point of the fisheye image. In this situation the average or median value of attributes (e.g., color, contrast, luminosity, brightness, etc.) for surrounding or neighboring points may be employed and mapped to the cube face 701.

Referring to FIG. 6, a block/flow diagram of a visualization system 202 for cubical mapped images is illustratively shown in accordance with the invention. System 202 includes a program storage device and processor, such as a computer for providing visualization processing for a user. System 202 may be a remote personal computer system connected to a network 30, such as the Internet. Block 21 has access to the images lying on the faces of the cube as determined in block 17 of FIG. 1. Images of block 17 may be provided through the Internet, or other network, be stored within system 202 for visual rendering on display 19. From the images of block 17 of FIG. 1, rectangular pieces are rendered, in block 21, and submitted to visualization on a display or screen 19. Data may be presented for a rectangular piece 602, and illustratively shown in FIG. 7. In block 22, the vectors $\vec{P}_0$, $\vec{P}_1$, $\vec{P}_2$ are generated and will limit the rectangular area to be visualized (e.g., piece 602). The complete visualized surface is a current vector $$\vec{Q}(u,v) = \vec{P}_o + u(\vec{P}_1 - \vec{P}_o) + v(\vec{P}_2 - \vec{P}_o); \quad u \in [0,1], \, v \in [0,1] \quad (12)$$

The current vector will cross the faces of the cube giving the user a perspective view. In accordance with the present invention, the user is able to view any area in the spherical region surrounding the origin O. The viewer can control the angles of rotation as indicated by arrows "A", "B" and "C" by employing interface 18. Advantageously, the user can look upward, downward and side to side, 360 degrees in any direction. In this way, ceiling, floors, walls, etc. may be viewed in a room or environment.

Each resulting point in rectangular piece 602 will include the color and light attributes presented by the equation (9) (determined in FIG. 1) and stored in the block 23. Rotation in a horizontal plane and/or in a vertical plane, the $\vec{P}_0$, $\vec{P}_1$, $\vec{P}_2$ vectors permit visualization of all or part of pieces of the cube's faces. This creates a sensation of natural motion to the user turning to look around a room or other environment. For example, turning 2 "P" vectors around a third "P" vector, the effect of turning around on an axis is experienced. The user can also move into other rooms or areas by employing similar methods. For example, changing the open angles between the three vectors the effect of rectilinear movement is realized to the effect of getting nearer or moving away from the visualized image, such as a doorway. As a new room is entered the surrounding cube is updated for the new room to supply new information about the surrounding area.

To increase the visualization speed and to obtain a better image with a higher resolution, a visualization subsystem 25 may be included which directly employs specialized subroutines in triangle rastering. These subroutines may include specially developed routines or commercially available subroutines, such as for example, an open graphics library (OPENGL) program. The open graphics library program can be employed with cubical formulas only. Spherical systems of the prior art cannot employ open graphics library programs since only spherical systems are employed. The open graphic library program advantageously employs the same baleation functions (directions of viewing, e.g., right to left and up and down) as the triangles which produce the visualization window.

Mapping or rendering, e.g., on the faces of a cube, is compatible to such a triangle rastering visualization. As accelerated video cards have their own facilities of triangle rastering, this visualization subsystem 25 may be generated to specify the cube having the complete image on its faces and to specify the texture of the cube's faces, thus specifying the resolution too. The visualization place needs to be determined (by the way of its coordinates), e.g., the center of the cube. The part of the cube to be visualized is specified with the help of the visualization window situated inside the cube. The visualization window provides a perspective view of the faces of the cube. The visualization window is specified by points, e.g., $P_1(x_1, y_1, z_1)$, $P_2(x_2, y_2, z_2)$, $P_3(x_3, y_3, z_3)$, all of them being situated on the cube's faces. A fourth point considered here as an opposite to $P_1$ and has the coordinates:

$$P_4(x_4, y_4, z_4): \begin{cases} x_4 = -x_1 + x_2 + x_3 \\ y_4 = -y_1 + y_2 + y_3 \\ z_4 = -z_1 + z_2 + z_3 \end{cases} \quad (13)$$

The points are taken close enough to the point of visualization so that visualization window remains inside the cube for all positions of the window.

In case a successive visualization of several images is desired (being in a logical sequence or chain of images) to be mapped on a cube. A "jumper point" is attached to every image so that as the "jumper point" is reached (activated), the current image is closed and a new image is opened to be visualized according to the above mentioned procedure. Jumper points may be employed in doorways or other areas between rooms, on objects within the rooms, for example, an object may be imaged which when approached (e.g., moving closer to it in virtual space) or clicked on will provide new images to open (e.g., a close up, etc.).

The creation processing and visualization omnidirectional images system may be employed in a plurality of applications. For example, in a particular useful embodiment, the present invention may include images for a home or building to be sold by a real estate agent. The real estate agent stores wide angle photographs which can be downloaded and viewed by potential buyers over the Internet. A whole presentation of the indoor and the outside of some chalets, apartments, hotels, offices or houses for sale may be provided. This is possible be capturing the fish-eye images of all spaces that will be visualized and storing the images in a desired sequence. A virtual tour of the property is therefore realized where a person can walk in the front door and tour the building by moving through the building room by room with the capability of viewing walls ceiling and floors.

A real estate that has such a system will be able to offer to its clients full information on the objects for sale and to give them opportunity of visualizing the desired building exactly as if they would have visited it, with all the details. All the details includes woodwork, furniture view from windows and any other details present on the premises. Jump points may be placed on objects within the home to permit other images to be seen. For example, a picture or window may include a jump point which changes the resolution or opens a new image.

The present invention may be employed to make presentations of indoor or outdoor historical or architectural monuments. For example, tourist agencies or historic scenes may be preserved or presented to a user by software or Internet for personal amusement or as an educational tool. The present invention may be employed to make a full presentation of galleries or museums. The virtual visitor will have the feeling he is really moving through this works of art and will have the opportunity to make inquiries or learn detail about the objects or pictures on display. The present invention may be employed to capture three dimensional images of events or gatherings, e.g., a family gathering, sporting event, etc., to create virtual albums including complete images which can be dynamically visualized every time so that the user will really participate in the action in the visualized place. Some natural or artificial phenomena having a high level of danger or taking place in difficult access areas (e.g., outer space) may be mapped and visualized by the present invention.

Another aspect of the present invention employs real-time imaging. The present invention may employ a camera set up which is continuously updating images. In this way, the system is able to supervise continuously any area that needs special attention (e.g., commercial space, banks, museums, treasures). For this purpose, two fish-eye lenses connected located 180 degrees apart are needed, and the system of FIG. 1 will be used to continuously update images and convert the images for visualization (by the system of FIG. 7). In a preferred embodiment, the system can capture frames at a rate of about 30 frames per second. The frames can be processed and visualized but the user will have to accept a poorer quality of the images unless higher processing rates are achieved.

Other applications of the present invention may include supervising and recording the access of persons in private houses or public institutions, miniaturizing the fish-eye lens to provide a system which can be employed in the medical field to visualize internal organs to improve diagnosis. The system of the present invention may be inserted into other systems able to create virtual realities on educational purposes or simply for fun or it may be used as a training tool for training of pilots, astronauts and navy personnel, etc. Many other uses and applications may be realized by the present invention.

Having described preferred embodiments for a novel system and method for creation, processing and visualization of omni-directional images (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. A method for digitally rendering omni-directional images comprising the steps of:
    capturing images surrounding an origin point in a at least two hemispheres surrounding the origin point;
    assembling the images in a digital format to create a complete spherical image surrounding the origin point;
    projecting the spherical image onto faces of a to cube surrounding the spherical image; and
    storing images projected on the faces of the cube to provide an omni-directional image.

2. The method as recited in claim 1, wherein the step of assembling the images in a digital format includes the step of transferring two planar fish-eye images to hemispherical images while removing distortions in the planar fish-eye images.

3. The method as recited in claim 1, wherein the step of assembling the images in the digital format includes the step of removing a demarcation line between the images in the digital format by averaging color and brightness characteristics between the images in the digital format.

4. The method as recited in claim 1, wherein the step of assembling the images in the digital format includes the step of removing a demarcation line between the images in the digital format by employing an error function between pixels of the images.

5. The method as recited in claim 1, wherein the images are taken with a fish-eye lens and further comprising the step of removing a demarcation line by removing pixels from the images in the digital format.

6. The method as recited in claim 1, wherein the step of projecting the spherical image onto faces of a cube surrounding the spherical image includes the step of providing a uniform resolution on a whole surface the cube.

7. The method as recited in claim 1, wherein the step of projecting the spherical image onto faces of a cube surrounding the spherical image includes the step of changing a resolution of the image projected on the cube.

8. The method as recited in claim 1, further comprising the step of displaying a portion of the image projected on the cube.

9. The method as recited in claim 8, wherein the step of displaying includes the step of resealing the image projected on the cube to provide a visualized image that creates a sensation of rectilinear movement in the visualized image.

10. The method as recited in claim 1, further comprising the step of dynamically exploring at least portions of a complete image projected on the faces of the cube.

11. The method as recited in claim 10, wherein the step of dynamically exploring includes providing rotations and translations in all degrees of freedom to permit exploring of the cube in a three-dimensional space.

12. The method as recited in claim 1, further comprising the step of transferring from one omni-directional image to another.

13. The method as recited in claim 1, wherein the images are captured by a fish-eye lens and further comprising the step of calibrating the fish-eye lens to determine radial distortion coefficients for determining specific distortions of the lens.

14. The method as recited in claim 1, further comprising the step of providing a user interface to permit manipulation of a displayed portion of the omni-directional image.

15. The method as recited in claim 1, further comprising the step of determining a center of the image to eliminate geometric distortions.

16. A program storage device readable by machine, tangibly embodying a program of instructions executable by the machine to perform method steps as recited in claim 1.

17. A method for digitally rendering omni-directional images comprising the steps of:
   capturing two fish-eye images, the fish-eye images being taken 180 degrees apart with respect to a plane from an origin point;
   converting the two fish-eye images to a digital format;
   assembling the two fish-eye images in the digital format to create a spherical image surrounding the origin point;
   projecting the spherical image onto faces of a cube surrounding the spherical image;
   storing images projected on the faces of the cube; and
   transferring a portion of the images projected on the faces of the cube to provide an omni-directional image to for visualization.

18. The method as recited in claim 17, wherein the step of converting the two fish-eye images to a digital format includes the step of transferring planar fish-eye images to a hemispherical image to remove distortions.

19. The method as recited in claim 17, wherein the step of assembling the two fish-eye images in the digital format to create a spherical image surrounding the origin point includes the step of removing a demarcation line between the two fish-eye images in the digital format by averaging color and brightness characteristics between the two fish-eye images in the digital format.

20. The method as recited in claim 19, wherein the step of removing a demarcation line includes removing halo regions from the two fish-eye images in the digital format.

21. The method as recited in claim 17, wherein the step of projecting the spherical image onto faces of a cube surrounding the spherical image includes the step of providing a uniform resolution on a whole surface the cube.

22. The method as recited in claim 17, further comprising the step of changing a resolution of the omni-directional image projected on the cube.

23. The method as recited in claim 17, further comprising the step of resealing the omni-directional image projected on the cube to provide a visualized image that creates a sensation of rectilinear movement in the visualized image.

24. The method as recited in claim 17, further comprising the step of dynamically exploring at least portions of the omni-directional image on the faces of the cube.

25. The method as recited in claim 24, wherein the step of dynamically exploring includes providing rotations and translations in all degrees of freedom to permit exploring of the cube in a three-dimensional space.

26. The method as recited in claim 17, wherein the step of transferring a portion of the images includes the step of transferring from one omni-directional image to another.

27. The method as recited in claim 17, further comprising the step of calibrating the fish-eye lens to determine radial distortion coefficients for determining specific distortions of the lens.

28. The method as recited in claim 17, wherein the step of assembling the two fish-eye images includes the step of removing a demarcation line between the images in the digital format by employing an error function between pixels of the images.

29. The method as recited in claim 17, further comprising the step of determining a center of the image to eliminate geometric distortions.

30. A program storage device readable by machine, tangibly embodying a program of instructions executable by the machine to perform method steps as recited in claim 17.

31. A system for digitally rendering omni-directional images, comprising:
   a computer device which receives digital images of a spherical region about an origin point;
   the computer device including a program storage device readable by the computer device, tangibly embodying a program of instructions executable by the computer device to:
      assemble the images to create a complete spherical image surrounding the origin point; and
      project the spherical image onto faces of a cube which surrounds the spherical image; and
   a display coupled to the computer device for displaying an omni-directional image mapped on the faces of the cube such that an entire surface of the cube is capable of being explored.

32. The system as recited in claim 31, further comprising a user interface to permit manipulation of a displayed portion of the omni-directional image.

33. The system as recited in claim 32, wherein the user interface permits resealing of the image projected on the cube to provide a visualized image that creates a sensation of rectilinear movement in the visualized image.

34. The system as recited in claim 32, wherein the user interface permits dynamical exploration of at least portions of a complete image projected on the faces of the cube.

35. The system as recited in claim 31, wherein the manipulation of a displayed portion of the omni-directional image includes rotation and rectilinear motion in all directions.

36. The system as recited in claim 31, further comprising a camera including a fish-eye lens which captures two images encompassing a sphere surrounding the origin point.

37. The system as recited in claim 31, wherein the program storage device stores color and brightness for points in the images.

38. The system as recited in claim 31, wherein the faces of the cube include a uniform resolution on a whole surface the cube.

39. The system as recited in claim 31, wherein the system permits rotations and translations of the displayed image in all degrees of freedom to permit exploring of the cube in a three-dimensional space.

40. The system as recited in claim 31, wherein the system permits a transfer from one omni-directional image to another.

* * * * *

US006754400C1

(12) EX PARTE REEXAMINATION CERTIFICATE (9844th)
United States Patent
Florin et al.

(10) Number: US 6,754,400 C1
(45) Certificate Issued: Sep. 17, 2013

(54) SYSTEM AND METHOD FOR CREATION, PROCESSING AND VISUALIZATION OF OMNI-DIRECTIONAL IMAGES

(75) Inventors: Rusu Mihai Florin, Bucharest (RO); Sever Serban, Bucharest (RO)

(73) Assignee: Tour Technology Systems, LLC, Queens Village, NY (US)

Reexamination Request:
No. 90/011,974, Nov. 21, 2011

Reexamination Certificate for:
Patent No.: 6,754,400
Issued: Jun. 22, 2004
Appl. No.: 09/777,912
Filed: Feb. 6, 2001

(51) Int. Cl.
*G06K 9/36* (2006.01)

(52) U.S. Cl.
USPC ........... 382/285; 382/167; 382/154; 382/284; 382/274; 382/275; 382/295; 382/296; 382/299; 345/419; 345/424

(58) Field of Classification Search
None
See application file for complete search history.

(56) References Cited

To view the complete listing of prior art documents cited during the proceeding for Reexamination Control Number 90/011,974, please refer to the USPTO's public Patent Application Information Retrieval (PAIR) system under the Display References tab.

*Primary Examiner* — David England

(57) ABSTRACT

A system and method for digitally rendering omni-directional images includes capturing images of a region 360 degrees about an origin point in a single plane, and assembling the images in a digital format to create a complete spherical image surrounding the origin point. The spherical image is projected onto faces of a cube surrounding the spherical image. Images which were projected on the faces of the cube may then be rendered to provide an omni-directional image.

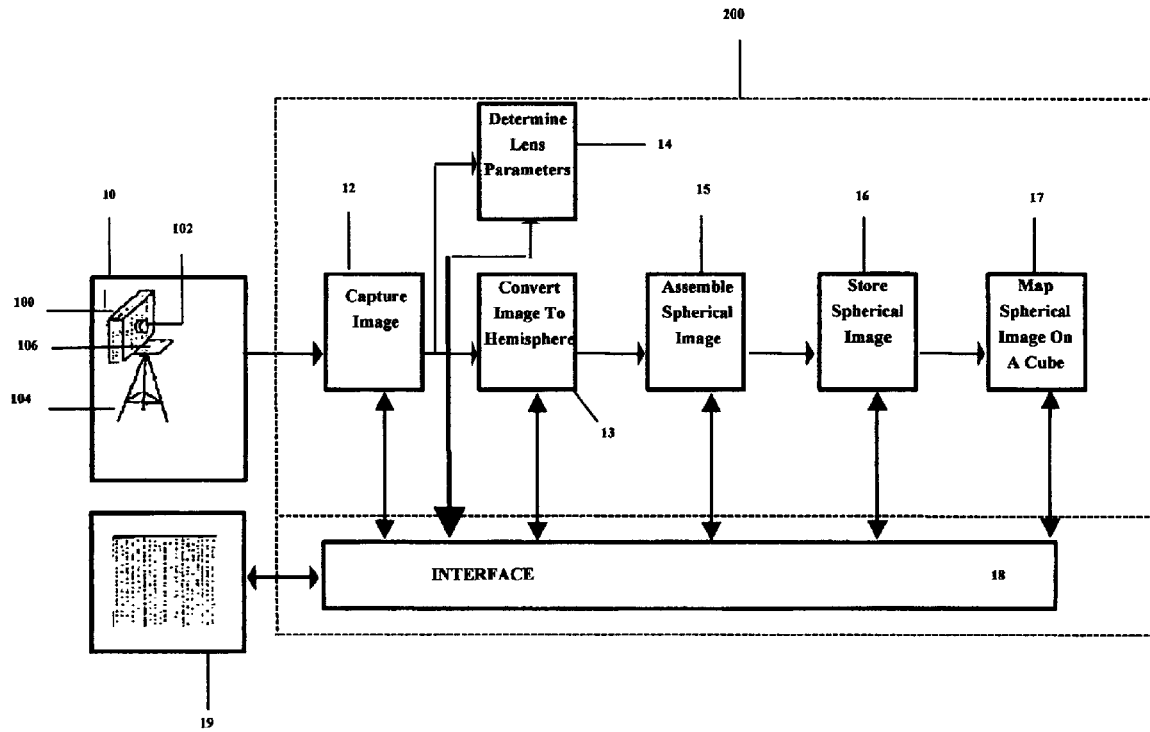

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 2, 8, 9, 12, 18, 23 and 33 are cancelled.

Claims 1, 4-6, 14, 16, 17, 30, 31 and 38 are determined to be patentable as amended.

Claims 3, 7, 10, 11, 13, 15, 19-22, 24-29, 32, 34-37, 39 and 40, dependent on an amended claim, are determined to be patentable.

New claims 41-75 are added and determined to be patentable.

1. A method for digitally rendering omni-directional images comprising the steps of:
capturing images surrounding an origin point in [a] at least two hemispheres surrounding the origin point;
assembling the images in a digital format to create a complete spherical image surrounding the origin point;
projecting the spherical image onto faces of a [to] cube surrounding the spherical image; [and]
storing images projected on the faces of the cube to provide an omni-directional image; *and*
*displaying at least a portion of the image projected on the cube,*
*wherein the step of displaying includes the step of resealing the image projected on the cube to provide a visualized image that creates a sensation of rectilinear movement in the horizontal and vertical directions in the visualized image.*

4. The method as recited in claim [1] *41*, wherein the step of assembling the images in the digital format includes the step of removing a demarcation line between the images in the digital format by employing an error function between pixels of the images *to minimize demarcations while permitting the successive visualization of images, and create the sensation to a viewer of movement.*

5. The method as recited in claim [1] *41*, wherein the images are taken with a fish-eye lens and further comprising the step of removing a demarcation line by removing pixels from the images in the digital format *images to minimize demarcations while permitting the successive visualization of images, and create the sensation to a viewer of movement.*

6. The method as recited in claim 1, wherein the step of projecting the spherical image onto faces of a cube surrounding the spherical image includes the step of providing a uniform resolution on a whole surface *of* the cube.

14. The method as recited in claim [1] *41*, further comprising the step of providing a user interface to permit manipulation of a displayed portion of the omni-directional image.

16. A program storage device readable by machine, tangibly embodying a program of instructions executable by the machine to perform method steps as recited in claim [1] *41*.

17. A method for digitally rendering omni-directional images comprising the steps of:
capturing two fish-eye images, the fish-eye images being taken 180 degrees apart with respect to a plane from an origin point;
converting the two fish-eye images to a digital format;
assembling the two fish-eye images in the digital format to create a spherical image surrounding the origin point;
projecting the spherical image onto faces of a cube surrounding the spherical image;
storing images projected on the faces of the cube; [and]
transferring a portion of the images projected on the faces of the cube to provide an omni-directional image to [for] visualization; *and*
*visualizing at least a portion of the image projected on the cube,*
*wherein the step of visualizing includes the step of resealing the omni-directional image projected on the cube to provide a visualized image that creates a sensation of rectilinear movement in the horizontal and vertical directions in the visualized image.*

30. A program storage device readable by machine, tangibly embodying a program of instructions executable by the machine to perform method steps as recited in claim [17] *58*.

31. A system for digitally rendering omni-directional images, comprising:
a computer device which receives digital images of a spherical region about an origin point;
the computer device including a program storage device readable by the computer device, tangibly embodying a program of instructions executable by the computer device to:
assemble the images to create a complete spherical image surrounding the origin point; [and]
project the spherical image onto faces of a cube which surrounds the spherical image; *and*
*reseal the image projected on the cube to provide a visualized image that creates a sensation of rectilinear movement in the horizontal and vertical directions in the visualized image;* and
a display coupled to the computer device for displaying an omni-directional image mapped on the faces of the cube such that an entire surface of the cube is capable of being explored.

38. The system as recited in claim 31, wherein the faces of the cube include a uniform resolution on a whole surface *of* the cube.

*41. A method as in claim 1, wherein a first piece of an image projected onto a face of a cube from said spherical image is submitted to visualization on a display for presentation to a viewer and followed by a second piece of an image projected onto a face of a cube from said spherical image being submitted to visualization as an image on said display.*

*42. A method as in claim 41, wherein the images are captured by a camera with a lens having a focal point, one of said images being captured with said camera at a first camera position of said camera, said camera being rotated substantially about the focal point of said lens to a second camera position, and the other of said images being captured while said camera is in said second camera position.*

*43. A method as in claim 41, wherein said viewer controls said visualization to look upward, downward and side to side to visualize a portion of the spherical image.*

*44. The method as recited in claim 43, wherein the step of projecting the spherical image onto faces of a cube surrounding the spherical image includes the step of providing a uniform resolution on a whole surface the cube.*

*45. A method as in claim 41, wherein said first piece and said second piece are visualized from separate cubes to create* a sequential display of images at a rate of three or more images per second to produce a substantially continuous visualization.

46. A method as in claim 3, wherein successive rows of pixels are cut from a captured image followed by rotation of that image closer to the other captured image.

47. A method as in claim 1, wherein a projection of the spherical image is specified, after said capturing of images surrounding an origin point and after said assembling the images in a digital format to create said spherical image, and such specified projection of a spherical image is used in said projecting the spherical image onto the face of a cube.

48. A method as in claim 47, further comprising performing the additional steps of again specifying a projection of a spherical image, after said capturing of images surrounding an origin point and after said assembling the images in a digital format to create said spherical image, again projecting the spherical image onto a face of a cube surrounding the spherical image in accordance with the again specified projection whereby an other spherically projected image suitable for display is generated; storing said other image.

49. A method for digitally rendering images as in claim 1, wherein three or more successive images are generated by repeatedly projecting the spherical image onto faces of a cube surrounding the spherical image to achieve continuous or successive visualization of said multiple images at a rate of three or more frames per second.

50. A method as in claim 49, wherein visulazation is done from different directions with respect to said spherical image.

51. A method for digitally rendering images as in claim 1, wherein multiple images are generated by repeatedly projecting the spherical image onto faces of specified cubes surrounding the spherical image to achieve continuous or successive visualization of said multiple images.

52. A method as in claim 51, wherein visulazation is done from different directions with respect to said spherical image, and said visualization is done at a rate of three or more frames per second.

53. A method as in claim 1 wherein the cube is specified in response to user input and the omnidirectional image visualized so that a viewer provided with said visualization can rotate said visualization to look upward, downward and side to side to visualize a portion of the spherical image, and wherein the area being visualized is defined by a plurality of vectors, wherein said vectors define open angles, and wherein said open angles may be varied by said user to visualize rectilinear movement simulating getting nearer or moving away from the image visualized on said display.

54. A method for digitally rendering images as in claim 1, wherein multiple images are generated by repeatedly projecting the spherical image onto faces of a cube surrounding the spherical image to achieve continuous or successive visualization of said multiple images at a rate of three or more frames per second, wherein visulazation is done from different directions with respect to said spherical image, and wherein the foregoing steps are repeated for successive visualization of a logical chain of images.

55. A method as in claim 28, wherein successive rows of pixels are cut from a captured image followed by rotation of that image closer to the other captured image.

56. A method as in claim 17, wherein a first piece of said spherical image is projected onto a face of said cube surrounding the spherical image and submitted to visualization on a display for presentation to a viewer and followed by a second piece of said spherical image being projected onto a face of said cube surrounding the spherical image and submitted to visualization to a viewer as an image on said display.

57. A method as in claim 56, wherein said viewer controls said visualization to look upward, downward and side to side to visualize a portion of the spherical image.

58. The method as recited in claim 57, wherein the step of projecting the spherical image onto faces of a cube surrounding the spherical image includes the step of providing a uniform resolution on a whole surface the cube.

59. A method as in claim 56, wherein said first piece and said second piece are visualized from separate cubes to create a sequential display of images at a rate of three or more images per second to produce a substantially continuous visualization.

60. A method as in claim 17, wherein a spherical image is specified, after said capturing of images and after said assembling the images to create said spherical image, and such specified spherical image is used in said projecting the spherical image onto a face of a cube.

61. A method as in claim 17 wherein said viewer can rotate said visualization to look upward, downward and side to side to visualize a portion of the spherical image, and wherein the area being visualized is defined by a plurality of vectors, wherein said vectors define open angles, and wherein said open angles may be varied by said user to visualize rectilinear movement simulating getting nearer or moving away from the image visualized on said display.

62. A method as in claim 31, wherein said program of instructions is executable by the computer device to project the spherical image multiple times with a plurality of angular orientations relative to the spherical image to generate a plurality of spherically projected images, whereby the image may be explored by displaying said plurality of projected images in a logical sequence.

63. A method for digitally rendering omni-directional images comprising the steps of: capturing images surrounding an origin point in at least two hemispheres surrounding the origin point; assembling the images in a digital format to create a complete spherical image surrounding the origin point; projecting the spherical image onto faces of a cube surrounding the spherical image; storing images projected on the faces of the cube to provide an omni-directional image, wherein a first piece of an image projected onto a face of a cube from said spherical image is submitted to visualization on a display for presentation to a viewer and followed by a second piece of an image projected onto a face of a cube from said spherical image being submitted to visualization as an image on said display, wherein said first and second pieces are successively submitted to visualization as successive images at a rate of between 3 and at least 30 images per second.

64. A method for digitally rendering omni-directional images comprising the steps of: capturing images surrounding an origin point in at least two hemispheres surrounding the origin point; assembling the images in a digital format to create a complete spherical image surrounding the origin point; projecting the spherical image onto faces of a cube surrounding the spherical image; storing images projected on the faces of the cube to provide an omni-directional image, wherein a first piece of an image projected onto a face of a cube from said spherical image is submitted to visualization on a display for presentation to a viewer and followed by a second piece of an image projected onto a face of a cube from said spherical image being submitted to visualization as an image on said display, wherein said viewer can rotate said visualization to look upward, downward and side to side to visualize a portion of the spherical image, and wherein the area being visualized is defined by a plurality of vectors, wherein said vectors define open angles, and wherein said open angles may be varied by said user to visualize rectilinear movement simulating getting nearer or moving away from the image visualized on said display.

65. A method for digitally rendering omni-directional images comprising the steps of: capturing images surrounding an origin point in at least two hemispheres surrounding the origin point; assembling the images in a digital format to create a complete spherical image surrounding the origin point; projecting the spherical image onto faces of a cube surrounding the spherical image; storing images projected on the faces of the cube to provide an omni-directional image, wherein a first piece of an image projected onto a face of a cube from said spherical image is submitted to visualization on a display for presentation to a viewer and followed by a second piece of an image projected onto a face of a cube from said spherical image being submitted to visualization as an image on said display, wherein said viewer controls said visualization to look upward, downward and side to side to visualize a portion of the spherical image, wherein successive rows of pixels are cut from a captured image followed by rotation of that image closer to the other captured image.

66. The method as recited in claim 65, wherein the image is rotated based on captured image lines, brightness or color.

67. The method as recited in claim 65, wherein the captured images are formed of pixels with attributes, such as color component values, color saturation and brightness, and the attributes of pixels situated around the limits one of said captured images are adjusted to reduce or eliminate a demarcation line.

68. The method as recited in claim 67, wherein the captured images are fisheye images and the center of the fisheye images is determined by covering at least a portion of each fisheye image with a large number of rays and determining the point on the image where the number of equal rays is the largest.

69. A method as in claim 68, wherein the images are captured by a camera with a lens, one of said images being captured with said camera at a first camera position of said camera, said camera being rotated substantially about the focal point of said lens to a second camera position, and the other of said images being captured while said camera is in said second camera position.

70. A method for digitally rendering omni-directional images comprising the steps of: capturing images surrounding an origin point in at least two hemispheres surrounding the origin point; assembling the images in a digital format to create a complete spherical image surrounding the origin point; projecting the spherical image onto faces of a cube surrounding the spherical image; storing images projected on the faces of the cube to provide an omni-directional image, wherein a first piece of an image projected onto a face of a cube from said spherical image is submitted to visualization on a display for presentation to a viewer and followed by a second piece of an image projected onto a face of a cube from said spherical image being submitted to visualization as an image on said display, wherein said viewer controls said visualization to look upward, downward and side to side to visualize a portion of the spherical image, wherein the portion of the spherical image being visualized is defined by a plurality of vectors, said vectors being disposed around a substantially central axis, said visualization being disposed substantially perpendicular to said substantially central axis.

71. A method as in claim 70, wherein said vectors define open angles, wherein said open angles may be varied by said user to visualize getting nearer or moving away from the image visualized on said display.

72. The method as recited in claim 71, wherein the step of projecting the spherical image onto faces of a cube surrounding the spherical image includes the step of providing a uniform resolution on a whole surface the cube.

73. The method as recited in claim 71, wherein said image is omni-directional in two orthogonal planes.

74. A method for digitally rendering omni-directional images comprising the steps of:
capturing two fish-eye images, the fish-eye images being taken 180 degrees apart with respect to a plane from an origin point;
converting the two fish-eye images to a digital format;
assembling the two fish-eye images in the digital format to create a spherical image surrounding the origin point;
projecting the spherical image onto faces of a cube surrounding the spherical image;
storing images projected on the faces of the cube; and
transferring a portion of the images projected on the faces of the cube to provide an omni-directional image to visualization, wherein a first piece of an image projected onto a face of a cube from said spherical image is submitted to visualization on a display for presentation to a viewer and followed by a second piece of an image projected onto a face of a cube from said spherical image being submitted to visualization to a viewer as an image on said display, and wherein said viewer can rotate said visualization to look upward, downward and side to side to visualize a portion of the spherical image, and wherein the area being visualized is defined by a plurality of vectors wherein said vectors define open angles, and wherein said open angles may be varied by said user to visualize rectilinear movement simulating getting nearer or moving away from the image visualized on said display.

75. A method for digitally rendering omni-directional images comprising the steps of:
capturing two fish-eye images, the fish-eye images being taken 180 degrees apart with respect to a plane from an origin point;
converting the two fish-eye images to a digital format;
assembling the two fish-eye images in the digital format to create a spherical image surrounding the origin point;
projecting the spherical image onto faces of a cube surrounding the spherical image;
storing images projected on the faces of the cube; and
transferring a portion of the images projected on the faces of the cube to provide an omni-directional image to visualization, wherein a first piece of an image projected onto a face of a cube from said spherical image is submitted to visualization on a display for presentation to a viewer and followed by a second piece of an image projected onto a face of a cube from said spherical image being submitted to visualization to a viewer as an image on said display, wherein said viewer controls said visualization to look upward, downward and side to side to visualize a portion of the spherical image, and wherein the portion of the spherical image being visualized is defined by a plurality of vectors, said vectors being disposed around a substantially central axis, said visualization being disposed substantially perpendicular to said substantially central axis.

* * * * *